United States Patent
Stotkiewitz et al.

(10) Patent No.: US 7,243,683 B2
(45) Date of Patent: Jul. 17, 2007

(54) OVERPRESSURE VALVE FOR THE CONTENT OF A PACKAGE

(75) Inventors: Herbert Stotkiewitz, Bietigheim-Bissingen (DE); Thomas Fischer, Remshalden-Geradstetten (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 10/531,696

(22) PCT Filed: Oct. 13, 2003

(86) PCT No.: PCT/DE03/03387

§ 371 (c)(1),
(2), (4) Date: Apr. 18, 2005

(87) PCT Pub. No.: WO2004/039692

PCT Pub. Date: May 13, 2004

(65) Prior Publication Data
US 2006/0006176 A1  Jan. 12, 2006

(30) Foreign Application Priority Data
Oct. 29, 2002 (DE) ................ 102 50 318

(51) Int. Cl.
F16K 15/14 (2006.01)
B65D 77/22 (2006.01)
B65D 33/01 (2006.01)

(52) U.S. Cl. ............... 137/859; 137/512.15; 220/89.1; 383/103; 426/118

(58) Field of Classification Search ........... 137/512.15, 137/852, 859; 220/89.1; 383/103; 426/118
See application file for complete search history.

(56) References Cited

U.S. PATENT DOCUMENTS

| | | | |
|---|---|---|---|
| 4,420,015 A | | 12/1983 | Blaser |
| 4,533,425 A | * | 8/1985 | Wehle ........................ 156/466 |
| 4,690,667 A | * | 9/1987 | Domke ....................... 493/213 |
| 5,515,994 A | * | 5/1996 | Goglio ....................... 220/372 |
| 5,584,409 A | * | 12/1996 | Chemberlen ............... 220/89.1 |
| 5,727,881 A | | 3/1998 | Domke |

FOREIGN PATENT DOCUMENTS

| | | |
|---|---|---|
| DE | 198 43 430 A1 | 3/2000 |
| EP | 0 870 697 A1 | 10/1998 |
| GB | 1 583 503 | 1/1981 |

* cited by examiner

Primary Examiner—Ramesh Krishnamurthy
(74) Attorney, Agent, or Firm—Ronald E. Greigg

(57) ABSTRACT

An overpressure valve for a packaging container is disposed on the inside of the packaging material comprising the packaging container. The overpressure valve comprises a base plate, a diaphragm, and a connecting element. The overpressure valve is relatively simple in construction and can be produced economically.

17 Claims, 1 Drawing Sheet

OVERPRESSURE VALVE FOR THE CONTENT OF A PACKAGE

CROSS-REFERENCE TO RELATED APPLICATIONS

This application is a 35 USC 371 application of PCT/DE 03/03387 filed on Oct. 13, 2003.

1. Field of the Invention

The invention relates to an improved overpressure valve for a packaging container.

2. Description of the Prior Art

One overpressure valve for a packaging container, known from German Patent Disclosure DE 35 21 373 A1, comprises a base plate and a diaphragm extending over the base plate. Slitlike gas passage openings are embodied in the diaphragm which at an appropriate overpressure in the packaging container communicate with a through opening in the base plate and thus form a through conduit for the gas. The known overpressure valve for a packaging container is intended for being mounted on the outside of the packaging container.

More and more, there is a demand by packagers to dispose such overpressure valves on the inside of a packaging container, so that the overpressure valve is not visually so striking and moreover is less susceptible to damage from outside. Although the known overpressure valve of DE 35 21 373 A1 does advantageously have a very simple structure, nevertheless this reference makes no suggestions of how such an overpressure valve would have to be embodied so as to be attached to the inside of a packaging container.

SUMMARY AND ADVANTAGES OF THE INVENTION

The overpressure valve of the invention for a packaging container has the advantage that while being very simple and therefore economical to produce, it can be disposed on the inside of a packaging container.

Advantageous refinements of the overpressure valve for a packaging container of the invention are disclosed. An especially low opening pressure of the overpressure valve can be attained if the at least one passage opening in the base plate takes the form of two intersecting circles. For joining the diaphragm to the base plate by a simple production process, in one advantageous version the diaphragm is embodied of two layers joined together; on one layer, an edge which extends all the way around is left free and is glued to the base plate. In another preferred version, the outer contours of the individual components of the overpressure valve are embodied essentially rectangularly, so that the overpressure valves can be formed by placing lengths of material one above the other; then the individual overpressure valves need merely be stamped out of the composite length of material, which produces relatively little waste.

BRIEF DESCRIPTION OF THE DRAWINGS

Exemplary embodiments of the invention are described in further detail below, with reference to the drawings, in which.

DESCRIPTION OF THE PREFERRED EMBODIMENTS

Figure 1:
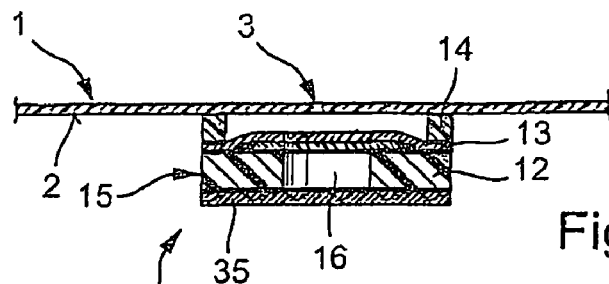
FIG. 1 is a cross section through an overpressure valve for a packaging container according to the invention and which is disposed on the inside of a wall of packaging material.

The overpressure valve 10 shown in FIG. 1 serves to conduct gas, present at overpressure in a packaging container, not shown, out of the packaging container so as to prevent the destruction of the packaging container. The overpressure valve 10 is preferably intended for use in coffee packages, where the packaging container is of flexible, hot-sealable packaging material. The overpressure valve 10 is secured to an inside 2 of a length of packaging material 1. Next, the packaging container in question, not shown, can be shaped from a portion of the length of packaging material 1 in such a way that the overpressure valve 10 is disposed on the inside surface of the packaging container.

What is essential is that at least one venting capability, in the form of a hole 3 or at least one slit, is provided in the length of packaging material 1 in the region of the overpressure valve 10. The embodiment of such holes 3 or slits is already state of the art and will therefore not be addressed further here.

Figure 5:
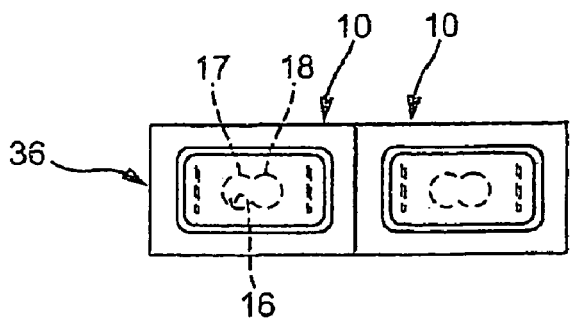
FIG. 5 is a plan view on a composite length of material from which the individual overpressure valves can be separated.

The overpressure valve 10 comprises three components: a base plate 12, a diaphragm 13, and a connecting element 14. The base plate 12, disposed on the side away from the inside 2 of the packaging material, has an approximately rectangular outer contour 15 in plan view and is preferably of PET (polyethylene terephthalate) with a thickness of approximately 200 μm. A passage opening 16 is embodied in the middle of the base plate 12, in the form of two intersecting circles 17, 18 (FIG. 5).

Figure 3:
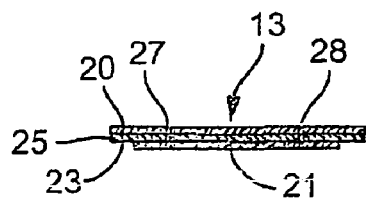
FIG. 3 is a plan view on a diaphragm.
Figure 4:
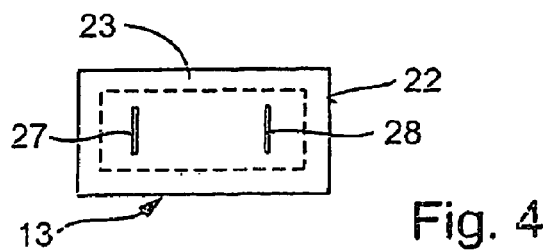
FIG. 4 is a side view of the diaphragm of FIG. 3.

The diaphragm 13 is glued to the top side of the base plate 12, that is, the side toward the inside 2 of the packaging material. As shown in FIGS. 3 and 4, the diaphragm 13 comprises two layers 20, 21. The outer contour 22 of the layer 20 facing away from the base plate 12 has the same shape and size as the outer contour 15 of the base plate 12. The layer 21 oriented toward the base plate 12 has a smaller size than the layer 20, such that between the two layers 20, 21 one above the other, an edge 23 which extends all the way around is formed in which only the layer 20 is present.

The two layers 20, 21 are joined together by means of an adhesive layer 25, which is applied to the full surface of the layer 20, so that the edge 23 likewise has the adhesive layer 25. In the region where the two layers 20, 21 overlap, there are elongated slits 27, 28, for instance two of them, spaced apart from one another in the diaphragm 13. The two slits 27, 28 may be produced by either a cutting or a stamping operation, but any other shape, number or size of slits or openings is conceivable. The two layers 20, 21 are likewise of PET, with a thickness of approximately 25 μm each, and the adhesive layer 25 has a thickness of approximately 20 μm. Because of its slight thickness, the diaphragm 13 has a certain flexibility or bendability perpendicular to the plane in which it extends.

In the region of the edge 23, the diaphragm 13 is joined by the adhesive layer 25 to the facing side of the base plate 12.

On the side toward the inside of the packaging material, the connecting element 14 is disposed on the diaphragm 13. The connecting element 14 is of PET, with a thickness of approximately 200 μm, and it has an outer contour 29 that corresponds to the outer contours 15, 22 of the base plate 12 and the diaphragm 13, respectively. Inside the connecting element 14, a rectangular recess 30 is embodied, which corresponds in shape and size approximately to the outer periphery of the layer 21 of the diaphragm 13.

Figure 2A:
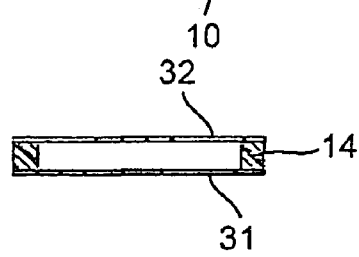
FIGS. 2a and 2b show connecting elements in plan view, one being suitable for being glued to the inner wall of the packaging material and the other being suitable for ultrasonic welding.
Figure 2A:
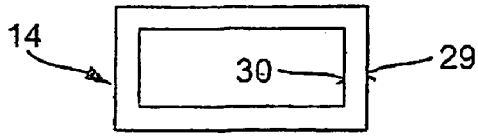

In a first version, shown in FIG. 2a, both the top and bottom sides of the connecting element 14 are provided with a respective adhesive layer 31, 32 over the full surface. While one adhesive layer 31 serves to join the connecting element 14 to the diaphragm 13, via the other adhesive layer 32 the connecting element 14 is glued over the full surface (except for the recess 30) to the inside 2 of the packaging material facing it.

Figure 2B:
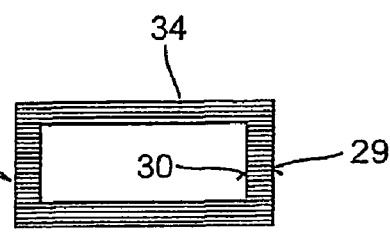

In another version, shown in FIG. 2b, although there is again an adhesive layer 31, the top side of the connecting element 14, oriented toward the inside 2 of the packaging material, is provided with the rippling 34, so that joining the overpressure valve 10 to the inside 2 of the packaging material is done by means of a ultrasonic welding operation.

The overpressure valve 10 described thus far is especially suitable whenever relatively large-particle foods which produce gas during storage are packed in the packaging container. An example of this is whole coffee beans. Conversely, if a product with relatively fine particles is packed, such as ground coffee, then it is necessary to prevent the product from getting into the region of the passage opening 16. In that case, as shown in FIG. 1, an additional filter element 35 is joined over the full surface to the base plate 12, on the side of the base plate 12 remote from the diaphragm 13. The filter element 35 is embodied such that a passage of gas from the package interior into the passage opening 16 can take place, and for this purpose the filter element 35 may for instance comprise filter paper or nonwoven fabric or thin, perforated plastic material.

With respect to the function of the overpressure valve 10, it will be noted that gas produced in the package interior gets into the passage opening 16, possibly after passing through the filter element 35. At a defined overpressure of the gas, the diaphragm 13 gradually lifts away, creating a conduit for the gas between the passage opening 16 and the slit or slits 27, 28. Once the gas 10 has passed through the slits 27, 28, it reaches the environment through the hole 3. As soon as the overpressure in the package interior has decreased because of the escape of the gas, the diaphragm 13 presses against the base plate 12 again and seals it off from the outside.

To improve the sealing of the diaphragm 13 with respect to the base plate 12, and in particular to prevent the entry of oxygen from the ambient air into the package interior, it is provided, as is widely done and well known and is therefore not shown, that a sealing agent, in particular silicone oil, be disposed between the diaphragm 13 and the base plate 12, in the region of the layer 21.

Such overpressure valves 10 described can be produced rationally and especially simply if they can be disposed directly adjacent one another from a composite foil and can then be separated or stamped out. For this purpose, FIG. 5 shows as examples of plurality of overpressure valves 10 disposed next to one another before they are separated from a composite film 36. The composite film 36 comprises a plurality of layers that respectively form base plates 12, diaphragms 13 and connecting elements 14.

The foregoing relates to preferred exemplary embodiments of the invention, it being understood that other variants and embodiments thereof are possible within the spirit and scope of the invention, the latter being defined by the appended claims.

The invention claimed is:

1. In an overpressure valve (10) for a packaging container, having a base plate (12), which is connectable to one wall (1) of the packaging container and has at least one passage opening (16) and is partially covered by a diaphragm (13) that has at least one passage (27, 28), the diaphragm being joined in its peripheral regions (23) at least partly to the base plate (12), so that upon an overpressure in the packaging container, a conduit is created from the at least one passage opening (16) in the base plate (12) to the at least one passage (27, 28), in order to conduct gas out of the packaging container through an opening (3) in the wall (1), the improvement wherein the overpressure valve (10) is connected to a wall (1) that forms the inside (2) of the packaging container; and wherein on the side of the base plate (12) oriented toward the inside (2), a connecting element (14) is disposed, the connecting element (14) having a closed contour, and the at least one passage (27, 28) in the diaphragm (13) being disposed inside the contour of the connecting element (14), wherein the diaphragm (13) has two layers (20, 21) comprising flexible plastic, the two layers being joined to one another over the full surface by means of an adhesive layer (25), and the layer (20) of the diaphragm (13) oriented toward the base plate (12) leaves an edge (23), which extends all the way around, on the other layer (21) of the diaphragm (13) free, that edge (23) being joined to the base plate (12).

2. The overpressure valve of claim 1, wherein the at least one passage is embodied as a slit (27, 28).

3. The overpressure valve of claim 1, wherein the at least one passage opening (16) in the base plate (12) has the form of two intersecting circles (17, 18).

4. The overpressure valve of claim 2, wherein the at least one passage opening (16) in the base plate (12) has the form of two intersecting circles (17, 18).

5. The overpressure valve of claim 1, wherein the diaphragm (13) covers the base plate (12) completely and is joined, on the side toward the base plate (12), to the base plate (12) over the full surface in a peripheral region that extends all the way around.

6. The overpressure valve of claim 2, wherein the diaphragm (13) covers the base plate (12) completely and is joined, on the side toward the base plate (12), to the base plate (12) over the full surface in a peripheral region that extends all the way around.

7. The overpressure valve of claim 3, wherein the diaphragm (13) covers the base plate (12) completely and is joined, on the side toward the base plate (12), to the base plate (12) over the full surface in a peripheral region that extends all the way around.

8. The overpressure valve of claim 4, wherein the diaphragm (13) covers the base plate (12) completely and is joined, on the side toward the base plate (12), to the base plate (12) over the full surface in a peripheral region that extends all the way around.

9. The overpressure valve of claim 1, wherein the at least one passage (27, 28) is embodied in the region of overlap of the two layers (20, 21) of the diaphragm (13).

10. The overpressure valve of claim 2, wherein the at least one passage (27, 28) is embodied in the region of overlap of the two layers (20, 21) of the diaphragm (13).

11. The overpressure valve of claim 3, wherein the at least one passage (27, 28) is embodied in the region of overlap of the two layers (20, 21) of the diaphragm (13).

12. The overpressure valve of claim 1, wherein the connecting element (14), on the side remote from the base plate (12), has a surface (34) that is uneven or rippled to facilitate joining the connecting element (14) to the inside (2) of the packaging container by means of ultrasonic welding.

13. The overpressure valve of claim 2, wherein the connecting element (14), on the side remote from the base plate (12), has a surface (34) that is uneven or rippled to facilitate joining the connecting element (14) to the inside (2) of the packaging container by means of ultrasonic welding.

14. The overpressure valve of claim 3, wherein the connecting element (14), on the side remote from the base plate (12), has a surface (34) that is uneven or rippled to facilitate joining the connecting element (14) to the inside (2) of the packaging container by means of ultrasonic welding.

15. The overpressure valve of claim 1, wherein the connecting element (14), on the side remote from the base plate (12), has an adhesive layer (32) and can be adhesively bonded to the inside (2) of the packaging container.

16. The overpressure valve of claim 2, wherein the connecting element (14), on the side remote from the base plate (12), has an adhesive layer (32) and can be adhesively bonded to the inside (2) of the packaging container.

17. The overpressure valve of claim 1, wherein the base plate (12) as well as the diaphragm (13) and the connecting element (14) each have an identical rectangular outer contour (15, 22, 29) in plan view.

* * * * *